(12) United States Patent
McAlister et al.

(10) Patent No.: US 10,305,724 B2
(45) Date of Patent: May 28, 2019

(54) DISTRIBUTED SCHEDULER

(71) Applicant: Google LLC, Mountain View, CA (US)

(72) Inventors: Jon P. McAlister, Mountain View, CA (US); Justin Christopher Haugh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 234 days.

(21) Appl. No.: 15/188,293

(22) Filed: Jun. 21, 2016

(65) Prior Publication Data

US 2016/0301559 A1  Oct. 13, 2016

Related U.S. Application Data

(63) Continuation of application No. 13/838,433, filed on Mar. 15, 2013, now Pat. No. 9,379,903.

(60) Provisional application No. 61/612,070, filed on Mar. 16, 2012.

(51) Int. Cl.
| | | |
|---|---|---|
| *G06F 15/173* | (2006.01) | |
| *H04L 12/24* | (2006.01) | |
| *G06F 11/34* | (2006.01) | |
| *G06F 11/30* | (2006.01) | |

(52) U.S. Cl.
CPC ........ *H04L 41/042* (2013.01); *G06F 11/3433* (2013.01); *G06F 11/302* (2013.01); *G06F 11/3409* (2013.01); *G06F 2201/81* (2013.01); *G06F 2201/865* (2013.01)

(58) Field of Classification Search
USPC ....... 709/203, 217, 223, 224, 206, 219, 226, 709/228, 230, 232, 238
See application file for complete search history.

(56) References Cited

U.S. PATENT DOCUMENTS

| | | | | |
|---|---|---|---|---|
| 7,457,722 B1 * | 11/2008 | Shain | ............ | G06F 11/3495 702/182 |
| 7,877,482 B1 * | 1/2011 | Ashcraft | ............ | G06F 9/5022 709/226 |
| 8,112,659 B2 * | 2/2012 | Agneeswaran | ..... | G06F 11/2041 714/13 |
| 8,447,851 B1 * | 5/2013 | Anderson | ............ | G06F 11/3006 709/217 |
| 8,719,804 B2 * | 5/2014 | Jain | ............ | G06F 11/3006 717/117 |
| 8,910,176 B2 * | 12/2014 | Lindsay | ............ | G06F 9/5061 709/203 |

(Continued)

*Primary Examiner* — Quang N Nguyen
(74) *Attorney, Agent, or Firm* — Lerner, David, Littenberg, Krumholz & Mentlik, LLP

(57) ABSTRACT

A method, system, and computer readable medium for managing applications on an application execution system are disclosed. On an application server the number of instances of a first application type that are in a busy state is determined. This determination is performed at each respective time interval in a plurality of time intervals. Then, a first running average for the busy state of the first application type is computed based upon the number of instances of the first application type that are in a busy state, at the application server, at each respective time interval. A removal request is sent when the first running average for the busy state meets a first removal criterion. The removal request is a request to remove the application server from a data structure that specifies which of a plurality of application servers accept service requests for the first application type.

15 Claims, 14 Drawing Sheets

(56) References Cited

U.S. PATENT DOCUMENTS

| | | | |
|---|---|---|---|
| 2010/0293268 A1* | 11/2010 | Jones | G06F 9/505 |
| | | | 709/224 |
| 2013/0124714 A1* | 5/2013 | Bednar | G06F 9/45558 |
| | | | 709/224 |
| 2013/0198319 A1* | 8/2013 | Shen | G06F 9/5077 |
| | | | 709/217 |

* cited by examiner

DISTRIBUTED SCHEDULER

CROSS-REFERENCE TO RELATED APPLICATIONS

The present Application is a continuation of U.S. patent application Ser. No. 13/838,433 filed Mar. 15, 2013, now U.S. Pat. No. 9,379,903, issued Jun. 28, 2016, which claims benefit of priority under 35 U.S.C. § 119 to U.S. Provisional Application No. 61/612,070, which was filed on Mar. 16, 2012, the entire contents of which are hereby incorporated by reference.

BACKGROUND

In general, increases in an application's popularity could present a variety of scalability problems that negatively impact a user's experience. For example, users could experience slower response times, slower page loading, and increased time outs on page requests. These scalability problems are typically alleviated by allocating additional capacity to the application such as more storage, more memory, more CPUs, and more machines in general.

Allocating or installing more computing capacity may be a reasonable solution when increases in an application's popularity are experienced over a prolonged period of time, or when usage of the application is predictable. Similarly, when an application experiences a decrease in usage, removing computing capacity previously allocated to the application may be a reasonable solution, especially when this is experienced over a prolonged period of time, or when the decrease is predictable. However, the popularity of an application is often unpredictable, due to a variety of factors (e.g., time of day, current events, advertising, trends, etc.), and fluctuates to a large extent, which creates load spikes and dips in the application execution or hosting system.

Predefined allocations of computing resources are inefficient solutions for handling temporary load spikes and dips. Increasing or installing more computing resources to handle a load spike is inefficient, since the additional pre-allocated resources go unused when the spike disappears (e.g., when the spike in demand subsides, or the application's popularity dips). Similarly, decreasing computing resources allocated to an application when its popularity declines is also inefficient, since future usage spikes will require the re-allocation of previously removed resources back to the application.

To complicate matters further, application systems may host a large number of heterogeneous applications, each with its own set of fluctuating resource requirements. Pre-allocation of resources, for the reasons discussed above, is often an inefficient solution for ensuring consistent positive user experiences among heterogeneous applications hosted on an application system.

SUMMARY

The present invention overcomes the limitations and disadvantages described above by providing methods, systems, and computer readable storage mediums for managing applications on an application execution system having a plurality of application servers.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments provide a method of managing applications on an application execution system having a plurality of application servers, a plurality of application types, and a plurality of data structures. Each application type in the plurality of application types has a corresponding data structure specifying which of the plurality of application servers accept service requests for the respective application type. On a first application server in the plurality of application servers having one or more processors, volatile memory and non-volatile memory storing one or more programs for execution by the one or more processors the following is performed. The number of instances of a first application type that are in a busy state is determined. This determination is performed at each respective time interval in a first plurality of time intervals. Then a first running average for the busy state of the first application type is computed. The first average is based upon the number of instances of the first application type that are in a busy state, at the first application server, at each respective time interval of a first subset of the first plurality of time intervals. A removal request is sent when the first running average for the busy state meets a first removal criterion. The removal request is a request to remove the first application server from the corresponding data structure that specifies which of the plurality of application servers accepts service requests for the first application type.

Some other embodiments provide an application execution system having a plurality of application servers, a plurality of application types and, for each respective application type in the plurality of application types, a corresponding data structure specifying which of the plurality of application servers accept service requests for the respective application type. A first application server in the plurality of application servers has one or more processors, volatile memory and non-volatile memory storing one or more programs. The one or more programs of the first application server include instructions for performing the following. A number of instances of a first application type that are in a busy state is determined. This determination is performed at each respective time interval in a first plurality of time intervals. Then a first running average for the busy state of the first application type is computed. The first average is based upon the number of instances of the first application type that are in a busy state, at the first application server, at each respective time interval of a first subset of the first plurality of time intervals. A removal request is sent when the first running average for the busy state meets a first removal criterion. The removal request is a request to remove the first application server from the corresponding data structure that specifies which of the plurality of application servers accepts service requests for the first application type.

Yet other embodiments provide a non-transitory computer readable storage medium storing one or more programs for execution by one or more processors of a first application server in an application execution system having a plurality of application servers, a plurality of application types and, for each respective application type in the plurality of application types, a corresponding data structure specifying which of the plurality of application servers accept service requests for the respective application type. The one or more programs stored by the non-transitory computer readable storage medium include instructions for performing the following. A number of instances of a first application type that are in a busy state is determined. This determination is performed at each respective time interval in a first plurality of time intervals. Then a first running average for the busy state of the first application type is computed. The first average is based upon the number of instances of the first application type that are in a busy state, at the first application server, at each respective time interval of a first subset of the first plurality of time intervals. A removal request is sent when the first running average for the busy state meets a first removal criterion. The removal request is a request to remove the first application server from the corresponding data structure that specifies which of the plurality of application servers accepts service requests for the first application type.

These methods, systems, and non-transitory computer readable storage mediums provide new, more efficient ways for an application server in an application execution system to self determine its utilization and to remove itself from its corresponding data structure when it is under-utilized. This frees up resources on the application server including the amount of available volatile memory, thus making it available to service other application types and relieve other application servers that are over-utilized. For example, the application server could be added to another data structure that specifies which of the plurality of application servers accepts service requests for another application type.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the present various embodiments may be practiced without these specific details. In other instances, well-known methods, procedures, components, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to," depending on the context. Similarly, the phrase "if it is determined" or "if (a stated condition or event]) is detected" may be construed to mean "upon determining" or "in response to determining" or "upon detecting (the stated condition or event)" or "in response to detecting (the stated condition or event)," depending on the context.

Figure 1:
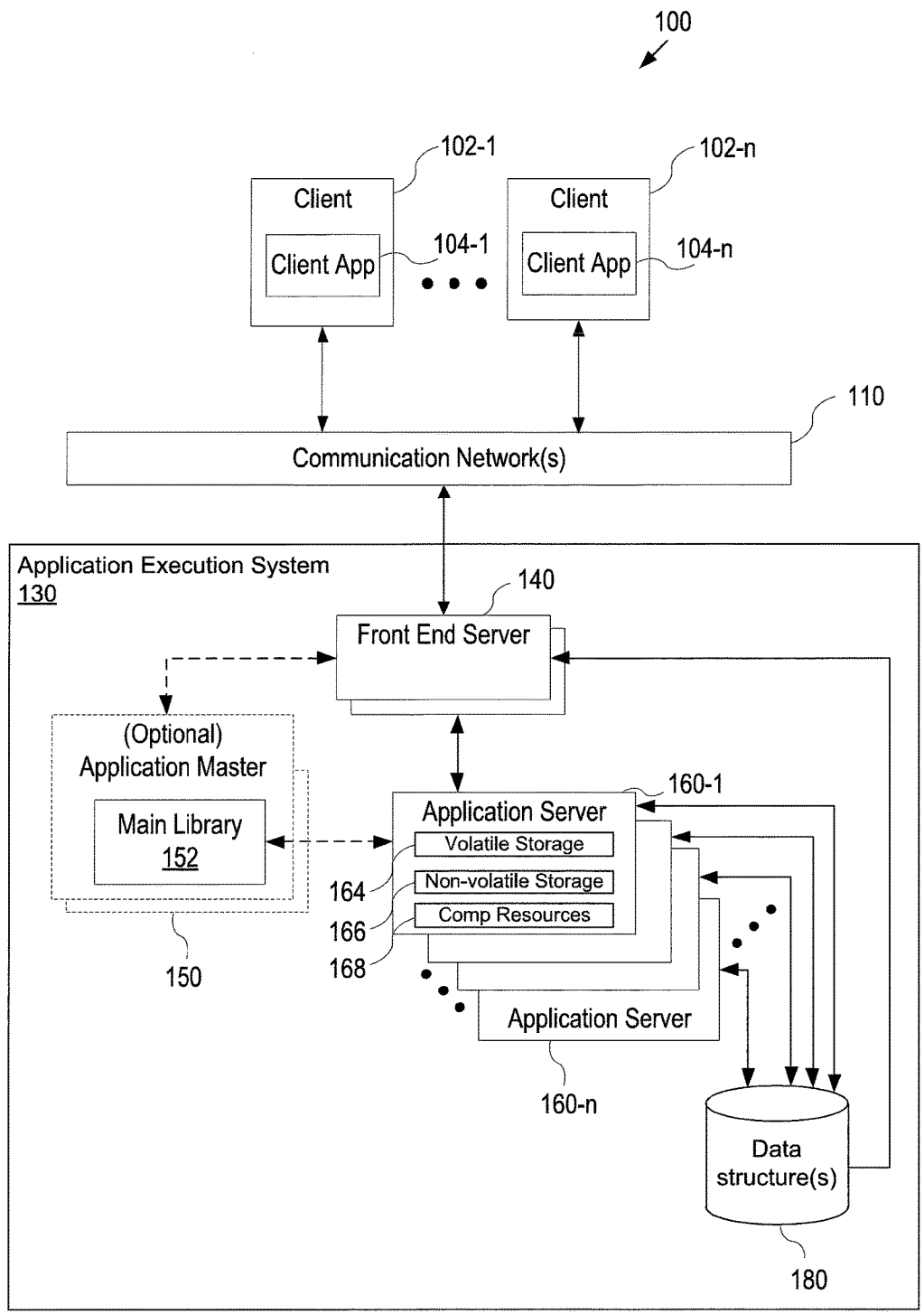
FIG. 1 is a block diagram of a distributed computing system including an application execution system according to certain embodiments.

FIG. 1 is a block diagram of a distributed computing system 100 including an application execution system 130 connected to a plurality of clients 102 (e.g. 102-1 ... 102-n) through a network 110 such as the Internet, other wide area networks, local area networks, metropolitan area networks, wireless networks, or any combination of such networks. In some embodiments, a respective client 102 contains one or more client applications 104 (e.g. 104-1 . . . **104-*n*), such as a web browser, for submitting application execution requests to the application execution system 130. The client 102 (sometimes called the "client device" or "client computer") may be any computer or similar device through which a user of the client 102 can submit requests to and receive results or services from the application execution system 130**. Examples include, without limitation, desktop computers, notebook computers, tablet computers, mobile devices such as mobile phones, personal digital assistants, set-top boxes, or any combination of the above.

In some embodiments, the application execution system 130 includes one or more front-end servers 140. The front-end sever 140 receives application execution requests from clients 102 and returns results to the requesting clients.

The application execution system 130 also includes a plurality of application servers 160 (e.g., 160-1 through **160-*n*). Each of the application servers 160 includes volatile storage 164 for executing one or more applications, non-volatile storage 166 for storing one or more applications, and computational resources 168 for executing applications in response to requests received by the application execution system 130**.

In some embodiments, the application execution system 130 also includes an application master 150 that distributes applications, from a main library 152 having a plurality of applications, among the application servers 160. In the embodiment shown in FIG. 1, the main library 152 is stored in the application master 150. In some embodiments, each application of the plurality of applications in the main library 152 is a web application that is responsive to HTTP requests. However, the present invention can also be used in non-web based environments, in which case the applications need not be web-based applications.

In some embodiments, the application execution system 130 includes a data store 180 that is accessible to each of the application servers 160, which includes information about which application servers accept service requests for a particular application.

Figure 2A:
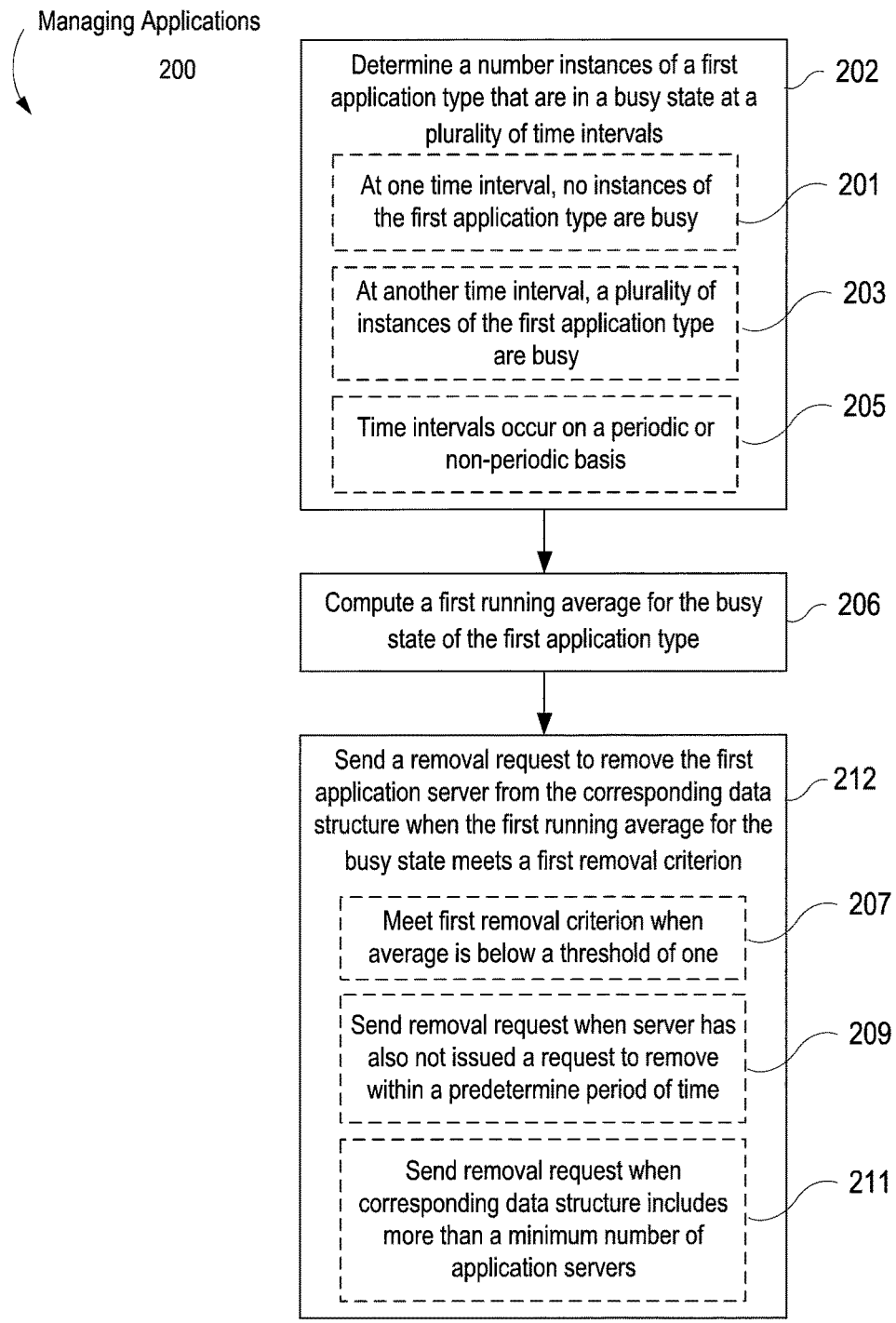
FIG. 2A is a flow diagram illustrating a method, performed by an application server, of managing a first application by sending removal requests, according to certain embodiments.

FIG. 2A is a flow diagram illustrating a 200 method according to certain embodiments, performed by an application server 160, of managing a first application by sending removal requests. The number of instances of a first application type that are in a busy state is determined (202). This determination is performed at each respective time interval in a first plurality of time intervals. In some embodiments, determining the number of instances of the first application type comprises interrogating, at each respective time interval in the first plurality of time intervals, a state of each instance of the first application type executed by a first application server.

In some embodiments, at a time interval in the first subset of time intervals, no instances of the first application type are in the busy state on the first application server (201). In some embodiments, at a time interval in the first subset of time intervals, one or more instances of the first application type are in the busy state on the first application server (203). For example, in some embodiments, at one or more time intervals in the first plurality of time intervals, five or more instances of the first application type are in the busy state on the first application server. The time intervals can occur on a periodic or non periodic basis (205). In some embodiments, time intervals in the first plurality of time intervals occur on a periodic basis such as once per second. In other embodiments, time intervals in the first plurality of time intervals occur on a non-periodic basis. In some embodiment, when the time intervals are non-periodic they are weighted proportionally with respect other of the time intervals in the first plurality of intervals. For example, if some intervals are 2 seconds and some are 4 seconds, the intervals of 4 seconds will have double the weight of the intervals of 2 seconds. In some embodiments, more recent time intervals receive greater weight than older time intervals. For instance, in some embodiments, the contribution of the number of instances of the first application type that are in the busy state in a given interval is down-weighted by some function of the amount of time that has elapsed since the time interval occurred.

Then a first running average for the busy state of the first application type is computed (206). The first average is based upon the number of instances of the first application type that are in a busy state, at the first application server, at each respective time interval of a first subset of the first plurality of time intervals. For the purpose of this application, average is defined as a measure of central tendency. As such mean, mode, average, and weighted mean may be used to compute the running average in various embodiments. Moreover, as discussed above, individual contributions to the computation of the running average may be independently weighed by factors such as interval duration and/or the amount of elapsed time since a given interval was measured.

A removal request is then sent when the first running average for the busy state meets a first removal criterion (212). The removal request is a request to remove the first application server from the corresponding data structure that specifies which of the plurality of application servers accepts service requests for the first application type. In some implementations, the corresponding data structure is stored in a common central data store, where the common central data store is addressable by each application server of the plurality of application servers. In some embodiments, the first running average for the busy state meets the first removal criterion when the first running average falls below a threshold of 1 (207). In most embodiments, the thresholds range from 0.1 to 2. In some embodiments, the ability for an application server to send a removal request is dampened by limiting the frequency with which the application server may issue such removal requests. In some embodiments, such a limitation is accomplished by requiring that the first running average for the busy state meets the first removal criterion at a time when the first application server has not issued a request to remove the first application server from the corresponding data structure within a predetermined period of time (209). In other words, if the first application server has very recently (such as within the last average computation time) sent a removal request, another removal request will not be sent immediately. Furthermore, in some embodiments, sending the removal request occurs when the first running average for the busy state meets the first removal criterion and also the corresponding data structure that specifies which of the plurality of application servers accept service requests for the first application type includes more than a minimum number of application servers (211). This allows for the application execution system 130 to ensure that some minimum capability to service requests of the first application type is available even during periods where there is a lull in requests for the full application type such that all the application servers are submitting removal request for the first application type. In some embodiments, this minimum number depends on the number of total application servers in the application execution system. In some embodiments, the minimum number depends on the demand popularity/request frequency of the application such that a higher minimum exists for more popular applications than is required for less popular applications. In some embodiments, the minimum number of application servers is always 3 no matter how small the demand for the application is. In some embodiments, the application server stores the minimum policy and also tracks or has access to information specifying which servers are listed as available to service requests for that particular application type. Thus, the application server will not make the removal request if the policy is not met.

In some embodiments, the determining and computing are periodically repeated without regard to whether the first running average for the busy state meets the first removal criterion.

Figure 2B:
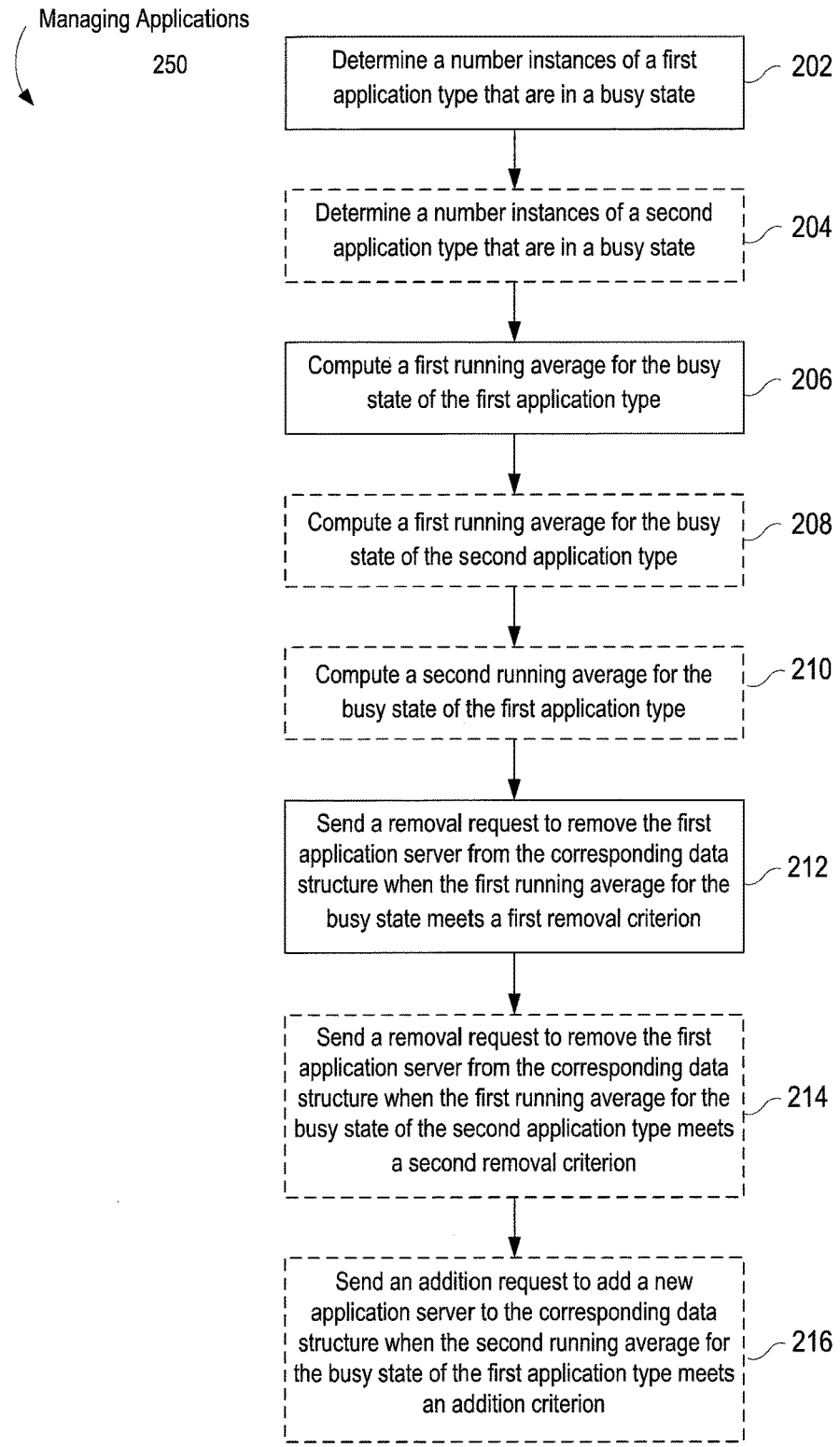
FIG. 2B is a flow diagram illustrating a method, performed by an application server, of managing a first and second application by sending removal requests and addition requests, according to certain embodiments.

FIG. 2B is a flow diagram illustrating a method 250, performed by an application server, of managing a first and second application by sending removal requests and addition requests, according to certain embodiments. As described with respect to FIG. 2A, the number of instances of a first application type that are in a busy state is determined (202). Similarly, in some embodiments, a number of instances of a second application type that are in a busy state is determined (204). These state determinations are performed at each respective time interval in the first plurality of time intervals.

Then, as described above with respect to FIG. 2A, a first running average for the busy state of the first application type is computed (206). Similarly, in some embodiments, a first running average for the busy state of the second application type is computed (208). This computation is based upon the number of instances of the second application type that are in the busy state, at the first application server, at each respective time interval of a second subset of the first plurality of time intervals. In most embodiments, the second subset of the plurality of time intervals (used for the second application type) will be the same as the first subset of the plurality of time intervals (used for the first application type) since both are used for a removal determination. In some embodiments the subsets are different, such as if the applications were different in popularity. For example, in some embodiments the second subset of intervals includes more intervals than the first subset of intervals.

As described above with respect to FIG. 2A, a removal request is sent to remove the application server from the data structure that specifies which of the plurality of application servers accept service requests for the first application type when the first running average for the busy state of the first application type meets a first removal criterion (212). Similarly, a removal request is sent to remove the first application server from the corresponding data structure that specifies which of the plurality of application servers accept service requests for the second application type when the first running average for the busy state of the second application type meets a second removal criterion (214). In some embodiments, the first removal criterion and the second removal criterion are the same. In other embodiments, the first removal criterion and the second removal criterion are different.

In some embodiments, the method 250 further comprises computing a second running average for the busy state of the first application type, based upon the number of instances of the first application type that are in a busy state, at the first application server, at each respective time interval of a third subset of the first plurality of time intervals (210). In this embodiment, an addition request is sent to add a new application server to the corresponding data structure that specifies which of the plurality of application servers accept service requests for the first application type when the second running average for the busy state of the first application type meets an addition criterion (216). In some embodiments, the second running average for the busy state of the first application type meets the addition criterion when the second running average exceeds a threshold of 3. In some embodiments the first subset and the third subset are the same and in such embodiments there is no need to separately calculate the second running average for the first application type because it will be equal to the first running average for the first application type. However, in most embodiments, the first subset and the third subset are different because generally a larger subset of time intervals is used to calculate the second running average, which dictates when addition requests are made, than the first running average which dictates when removal requests are made.

In some embodiments, with respect to addition requests, the new application server is selected randomly from among the application servers in the plurality of application servers that are not presently in the corresponding data structure that specifies which of the plurality of application servers accept service requests for the first application type. In some embodiments, the application server has a list of which other application servers are in the group and what type of applications they are capable of servicing. As such, in some embodiments, the new application server is selected by the first application server randomly from among the application servers in the plurality of application servers that are not presently in the corresponding data structure that specifies which of the plurality of application servers accept service requests for the first application type.

In some embodiments, the methods described with respect to FIGS. 2A and 2B are performed on a second application server 160-2 in the plurality of application servers. As such, a number instances of the first application type that are in a busy state at each respective time interval in a second plurality of time intervals is determined. A third running average is determined for the busy state of the first application type, based upon the number of instances of the first application type that are in a busy state, at the second application server, at each respective time interval of a first subset of the second plurality of time intervals. A removal request is then sent to remove the second application server from the corresponding data structure that specifies which of the plurality of application servers accept service requests for the first application type when the third running average for the busy state meets the first removal criterion. In some embodiments, the first plurality of time intervals and the second plurality of time intervals are the same. In some embodiments, the first plurality of time intervals and the second plurality of time intervals are different.

Figure 2C:
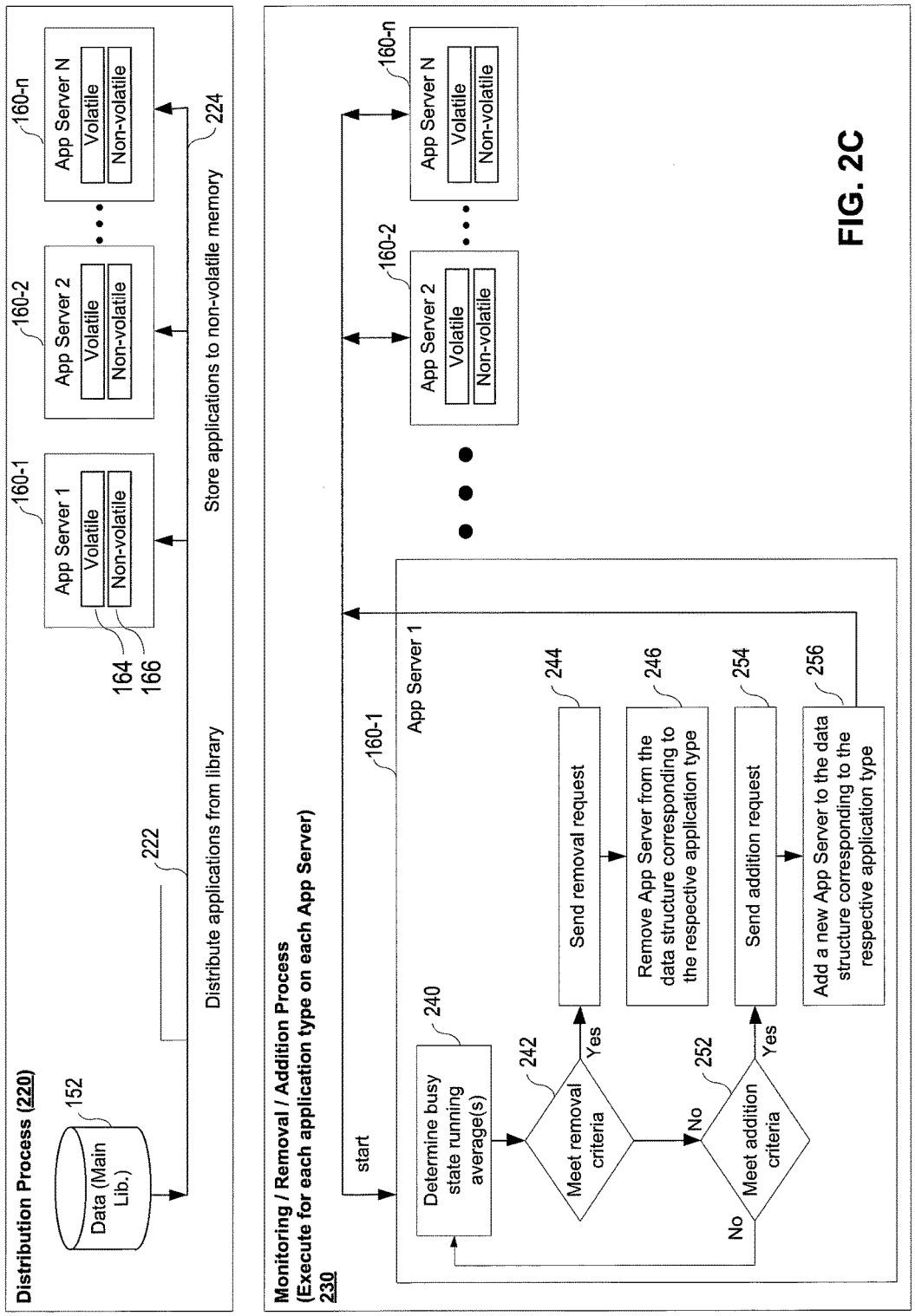
FIG. 2C is flow diagram illustrating a method, performed by a plurality of servers of managing a plurality of applications by sending removal requests and addition requests, according to certain embodiments.

FIG. 2C is flow diagram illustrating a method, performed by a plurality of servers 160-1 to 160-n, of managing a plurality of applications by sending removal requests and addition requests, according to certain embodiments. The top portion of FIG. 2C is a schematic view of a distribution process 220 in which applications are distributed (222) from a main library 152 to application servers 160-1 to 160-n for storage in non-volatile storage. Each of the application servers 160 stores (224) in its non-volatile storage the applications distributed to it by the application master. In some embodiments, the application master 150 (FIG. 1) distributes each application in the main library 152 to at least three of the application servers 160. The minimum number of application servers to which each application is distributed is selected in order to ensure at least a predefined minimum level of service for every application in the main library.

Each application server performs a monitoring process in which it evaluates its application(s)' usage according to one or more pre-defined criteria, and takes appropriate action by sending an addition or removal request. This process substantially simultaneously occurs in each of a subset of servers for one or more of their applications. This substantially simultaneous processing by multiple servers helps to provide sufficient resources to service client requests for execution of the applications. The process is often more efficient than pre-allocating computing resources because it can more easily and quickly handle temporary load spikes and dips. It is also more efficient than increasing or installing more computing resources to handle a load or spike, because those additional resources go unused when the spike disappears. In some embodiments, the monitoring process includes evaluating usage level thresholds for a first application type. For example, in some embodiments there are minimum and maximum thresholds. If the usage level for a first application is below the minimum usage threshold and/or if it meets one or more removal criteria (242-yes), the application server sends a removal request (244) to the data store 180 (or the application master 150 in some embodiments). The removal request is a request to remove that application server from the corresponding data structure that specifies which application server accepts request for the first application type. Then, unless the removal request is denied, the application server is removed from its corresponding data structure (246). Similarly, if the usage level is above the maximum usage threshold and/or meets one or more addition criteria (252-yes), the application server sends an addition request (254) to the data store 180 (or the application master 150 in some embodiments). The addition request is a request to add a new server to the corresponding data structure that specifies which application server accepts request for the first application type. Then unless the addition request is denied, a new application server is added to the corresponding data structure (256).

Occasionally, application server(s) may need to be removed (or taken offline) from a cluster for repairs, routine maintenance, and other reasons. In these situations, the load handled by the application server(s) to be removed is redistributed across the remaining active application servers. The process of transferring load to the active servers may be rate-limited so that application servers can be safely removed after a period of time without disrupting the system.

In some embodiments, the adding and removing of an application server from the data structure that specifies which servers accept service requests for a particular application type is rate limited with respect to how many applications are added or removed in any given predetermined period of time. A rate limit (e.g., a limit of N applications per unit of time) may be applied to each application server individually, or to a cluster or other group of application servers. In some embodiments, the rate limit is set small enough so that changes in the load pattern of an application server occur slowly, rather than all at once, which allows the application execution system 130 to make other changes to account for the load. For example, the load increase that will be caused by adding a new application to a server may be unknown. It may cause a large increase in load on the server, or it may have no effect. By rate limiting how many applications are added to an application server, the system is given more time to adjust to changes in loads caused by the additions or removals. Similarly, by rate limiting how many applications are removed from each server, the likelihood of numerous servers removing the same application (and thus causing the application execution system to have too few servers available to service requests for a particular application type) is diminished.

Figure 3A:
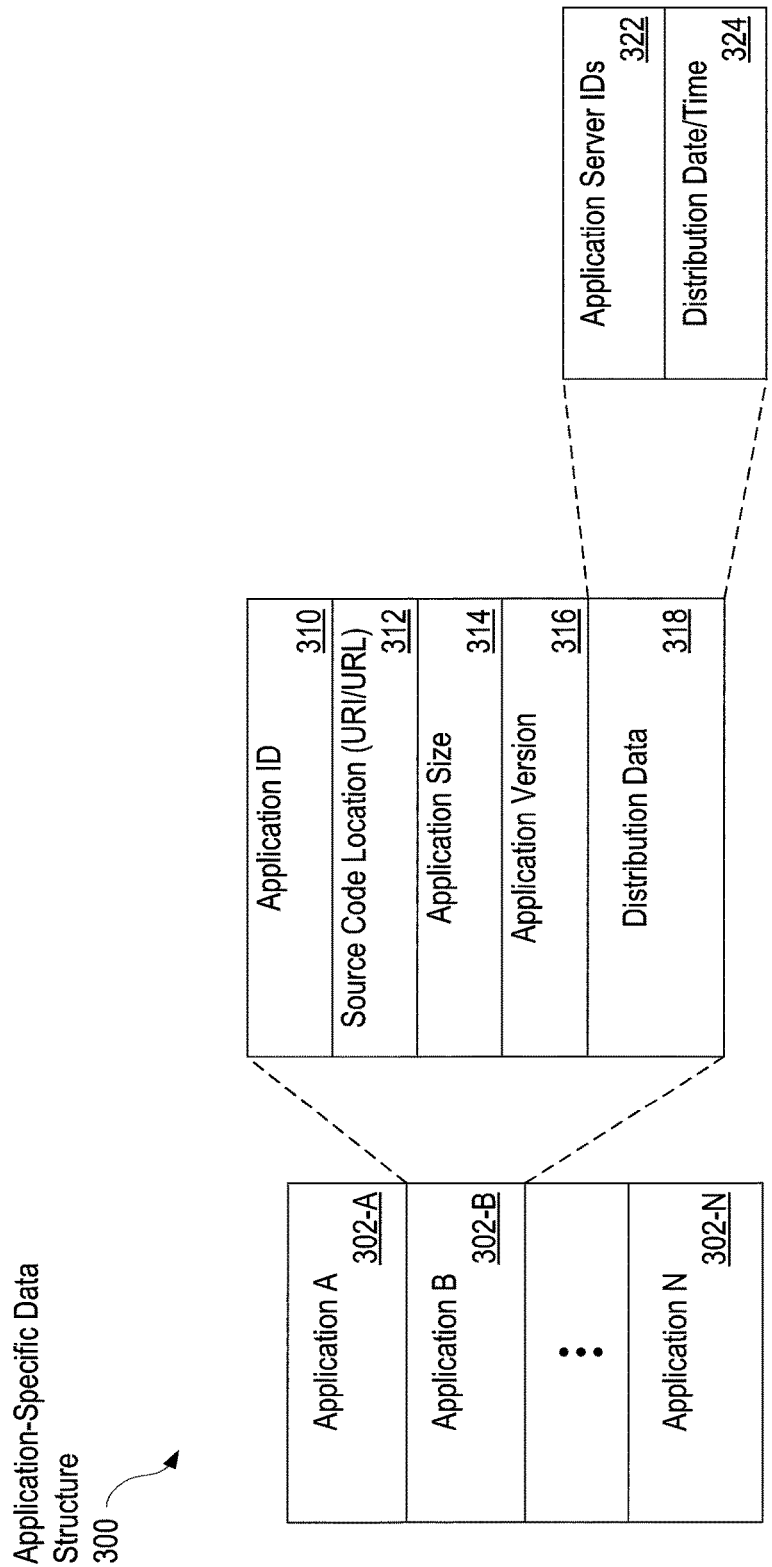
FIG. 3A represents an application-specific data structure that specifies which application servers accept service requests for a first application type, according to certain embodiments.

FIG. 3A represents an application-specific data structure that specifies which application servers accept service requests for a first application type, according to certain embodiments. FIG. 3A is a block diagram of a table or other data structure 300 within data structure 180. In some embodiments the data structure 300 stores information about each of the applications in the main library 152. Alternately, the data structure 300 includes information for a subset of the applications, such as active applications that have been distributed to a subset of application servers. The data structure 300 includes a respective record 302 for each application for which information is stored. In some embodiments, the record 302 stores the information specific to the application (e.g., record 302-B for Application B) including:
- a unique application identifier (application ID) 310;
- the location of the application's source code (Source Code Location) 312;
- the storage size of the application 314;
- a version identifier for the application 316;
- distribution data 318 identifying application servers that have a copy of the application in their local libraries, which includes: information identifying the application servers that contain the respective application and are available to service requests for that particular application type (e.g., Application Server IDs) 322; and optionally, dates and times showing when the respective application was distributed to the identified application servers (Distribution Date/Time) 324.

Figure 3B:
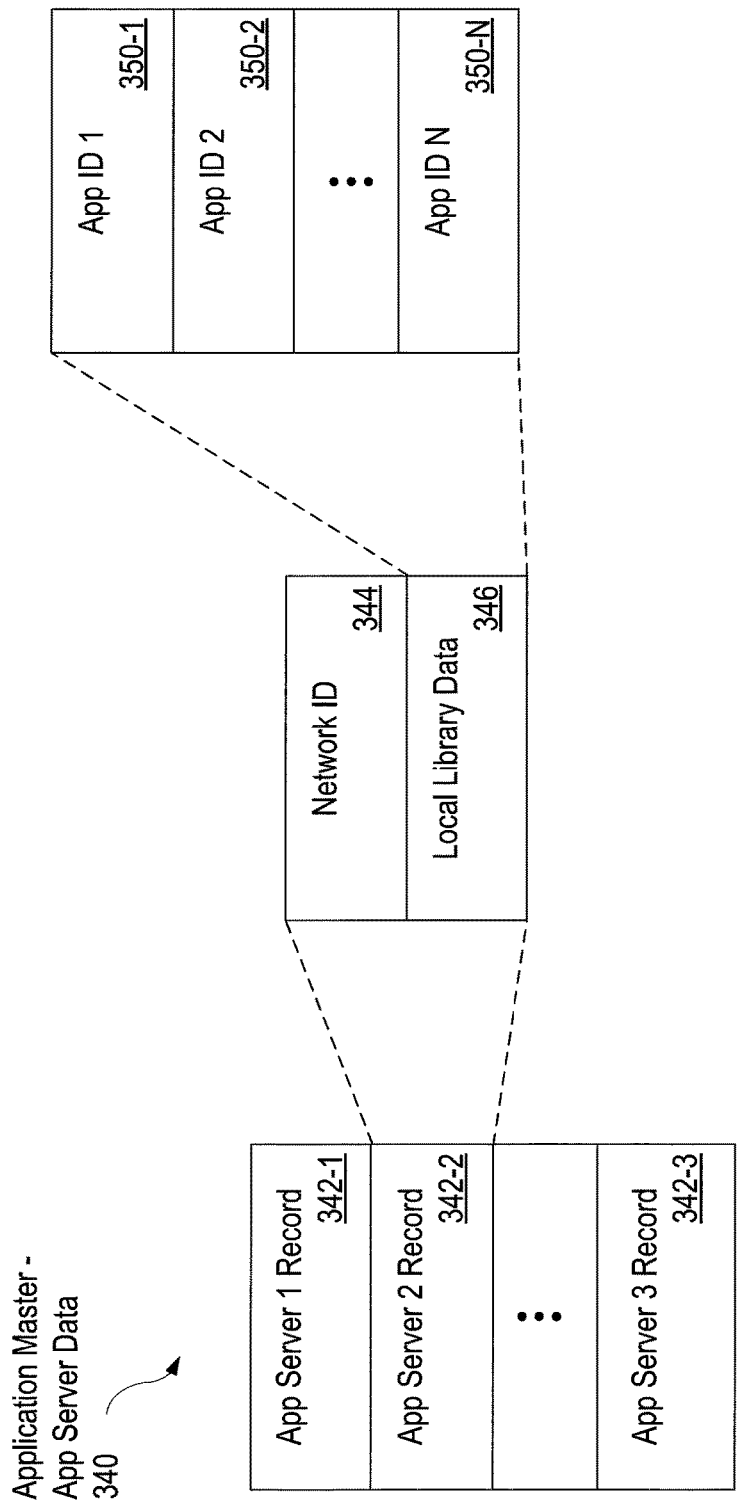
FIG. 3B illustrates a data structure used by an application master to store information concerning a set of application servers to which a set of applications have been distributed, according to certain embodiments.

FIG. 3B illustrates a data structure 340 used by an optional application master 150 to store information concerning a set of application servers 160-1 to 160-n to which a set of applications have been distributed, according to certain embodiments. In some embodiments, the data structure 340 includes information for a subset of the application servers, such as active application servers serviced by the application master. The data structure 340 includes a respective record 342 for each application server for which information is stored. In some embodiments, the record 342 is maintained by the application master 150 and stores the information specific to the application server (e.g., record 342-2 for Application Server 2), including:
- a unique identifier 344 (e.g., network ID) for the application server, for example an identifier that indicates or that can be used to find the server's location on the network; and
- local library data 346 identifying the specific applications installed on the application server's local library.

The local library data 346 includes information (e.g., application identifiers 350) identifying the applications installed on the application server. Optionally, local library data 346 includes additional information, such as distribution date information or version information for the listed applications. The information in the local library data 346 for a respective application server is received from that application server, and may be stored at the application server either as a distinct data structure, or together with the local application library itself, or in combination with other information retained by the application server.

Figure 3C:
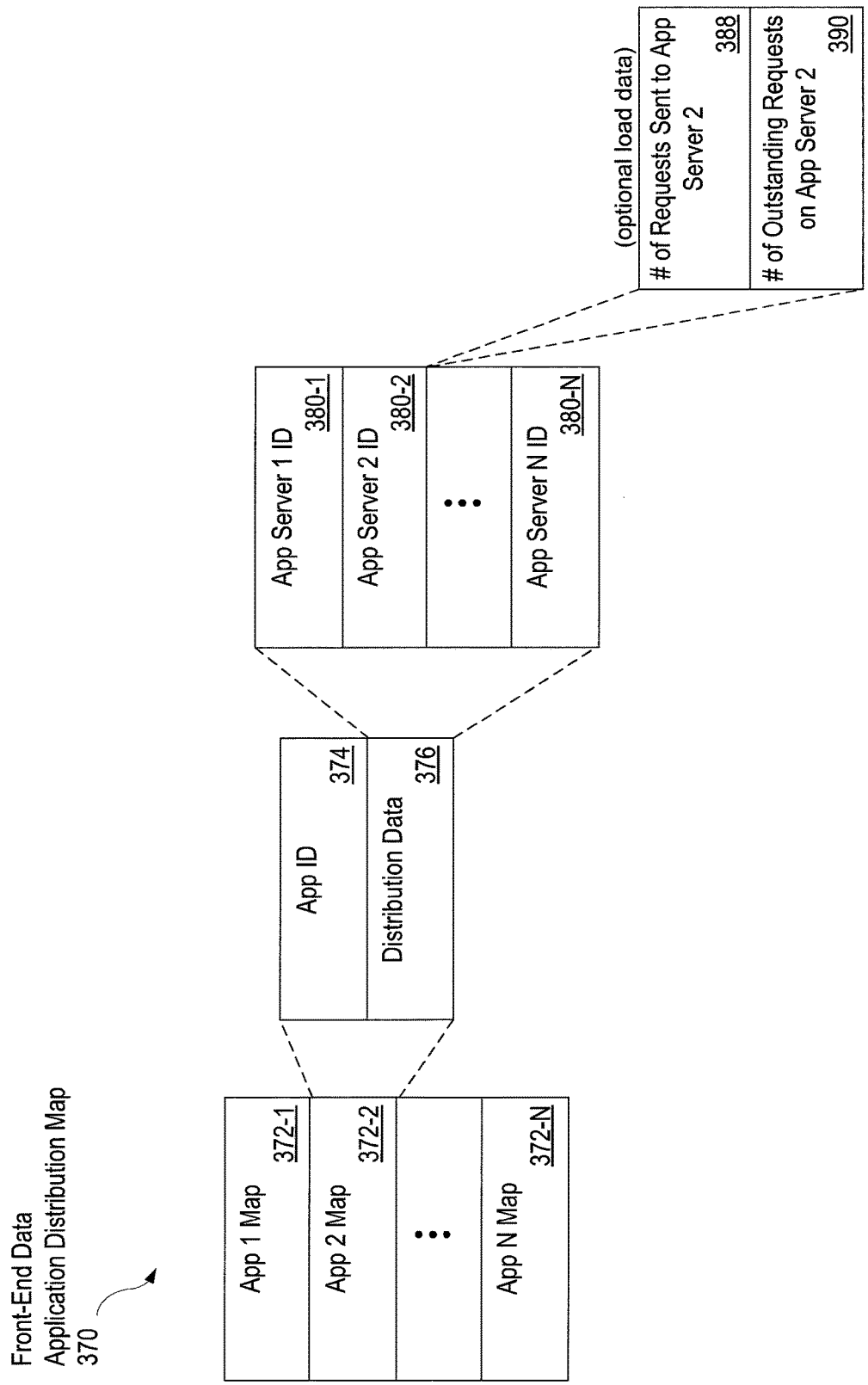
FIG. 3C illustrates a data structure used by a front-end server to route application processing requests to application servers, according to certain embodiments.

FIG. 3C illustrates a data structure 370 used by a front-end server 140 to route application processing requests to application servers 160, according to certain embodiments. In accordance with some embodiments, the data structure(s) 180 contain distribution data identifying which of the application servers 160 will accept service requests for each of a plurality of application types, and the one or more front-end servers 140 of the application execution system 130 route requests to the application servers in accordance with the distribution data. In the example shown in FIG. 3C, the distribution data, and optionally other information that can be used for determining the application server to which a respective application execution request should be routed, is stored in data structure 370.

The data structure 370 stores a respective record 372 for each application to which the front-end 140 may need to route application execution requests. This record 372 may be called an application distribution map. In some embodiments, the record 372 for a respective application includes the following information: an identifier 374 of the application, and distribution data 376 for the application. The distribution data 376 includes a list of identifiers 380 or other information identifying the application servers 160 that have a copy of the application in their local libraries and will accept service requests for the application corresponding application type. Optionally, the front end application server may include in the resource data 370 for a particular application server: the number of (application execution) requests 388 that have been sent to the application server over a defined period of time (e.g., the past hour), and/or the number of outstanding (or queued) requests 390 that are pending at the application server. The resource data 370, stored by the front-end for a respective application server may comprise averages or running averages of resource usage by the applications being executed by the respective application server.

The front-end server 140 receives at least a portion of the application distribution map 370 from the data structure 180 (or in some embodiments from the application master 150), or a cached copy thereof. As noted above, the application distribution map 370 optionally includes resource usage information that can be used to route requests received from client(s) 102. For example, upon receiving a request from a client to execute a specified application, the front-end server 140 accesses the corresponding record 372 (of application distribution map 370) for the specified application, or the cached copy thereof, to determine the application servers that will accept service requests for that application. In some embodiments, the front-end server 140 routes such requests using a round robin methodology (e.g., in round robin order within the list of application servers in the record 372 for the application), or a random assignment methodology (e.g., randomly or pseudo-randomly among the application servers listed in record 372).

In some other embodiments, the front-end server 140 routes requests based on current and historical load information that the front end server has observed directly. Two load metrics that the front-end server 140 can observe directly are the number of application execution requests that the front-end server 140 has recently sent to each application server, and the number of currently outstanding application execution requests at each application server (e.g., the number of recent application execution requests sent to each application server which have yet to return results or a completion signal). It is noted that the number of pending application execution requests (also called currently outstanding application execution requests) is a latency metric, and thus measures performance from the perspective of the system's users. Using this information, which may be observed and stored by the front-end server 140, the front end server 140 may route application requests. For example, the front-end server 140 may route a request to the application server that (A) will accept service requests for the requested application, and (B) has the least number of outstanding requests. In another example, the front-end server 140 may route a request to the application server that (A) will accept service requests for the requested application, and (B) has the least number of outstanding requests for the requested application.

Figure 4A:
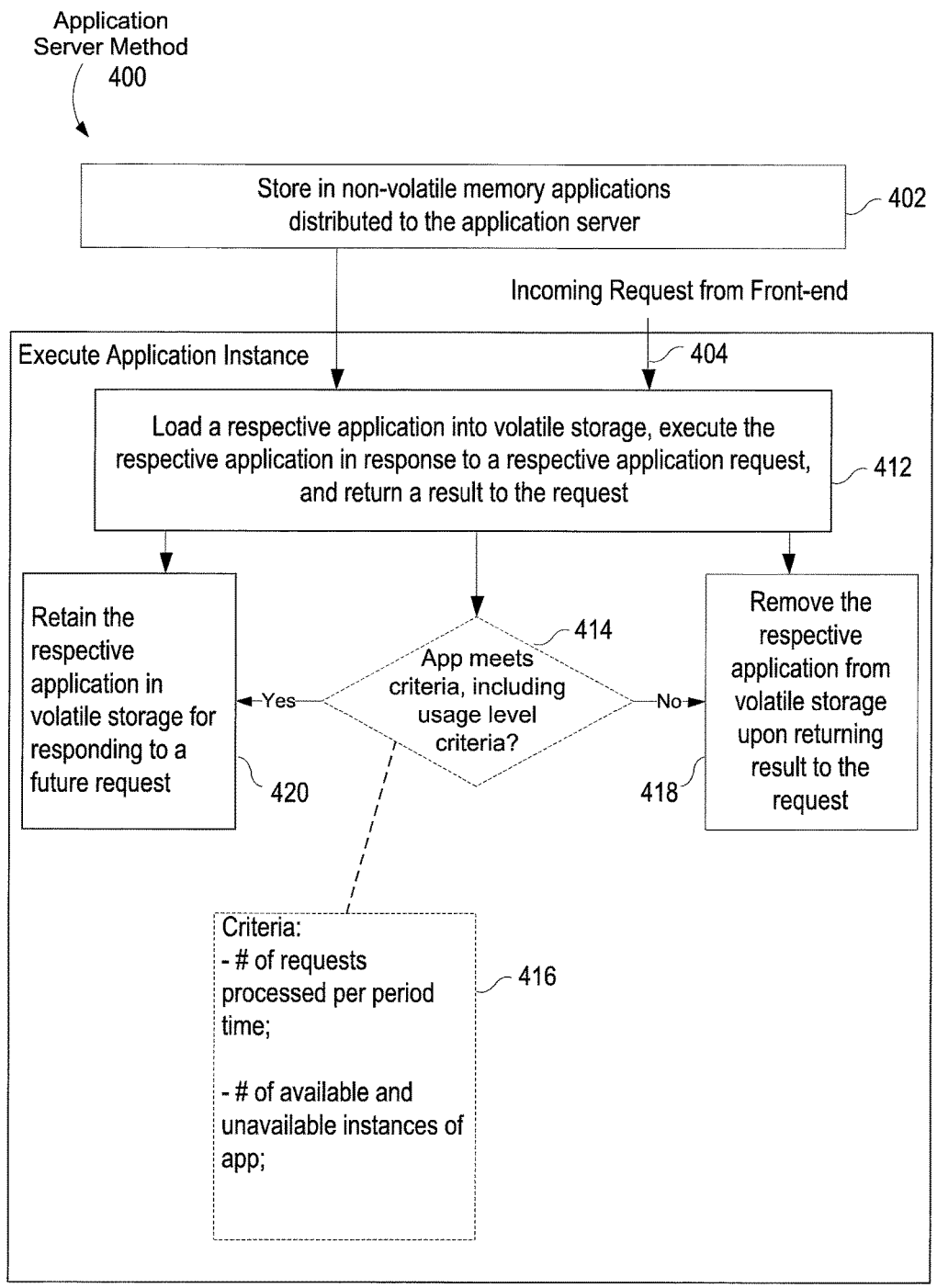
FIG. 4A is a flow diagram illustrating a method, performed by an application server, of executing an application in response to an application request, according to certain embodiments.

FIG. 4A is a flow diagram illustrating a method 400, performed by an application server 160, of executing an application in response to an application request, according to certain embodiments. The applications distributed to the application server are stored in the application server's non-volatile memory (402). Assuming that there is sufficient volatile memory, in response to an application request (404) from the front-end 140, the application server loads the requested application into volatile storage, executes the requested application, and returns a result to the request (412). The application server may remove one or more applications from volatile memory before performing operation 412 when there is insufficient volatile memory to process the request. Alternatively, the application server may automatically remove applications from volatile memory when the amount of available volatile storage is below a predefined threshold. Notwithstanding the above, in some embodiments, an application capable of servicing the application request is already running when the application request is received. In such embodiments, the application services the application request. Moreover, it will be appreciated that some applications may be complex and, for example, include several libraries and other components. Thus, as used herein, the phrase "loading the requested application into volatile storage" means loading a sufficient portion of the program into volatile storage such that the application may be executed.

In some embodiments, after returning the result that is responsive to the request, the application server can either remove the portions of the respective application that are in volatile storage (418), or retain the respective application in volatile storage (420) for responding to future requests, by determining whether one or more predefined criteria have been met (414). In some embodiments, the one or more predefined criteria (416) used by the application server include one or more usage level criteria, which may include the number of requests for the application processed per period of time. The one or more predefined criteria may also include caching criteria, which may include the number of respective application instances in volatile storage available for handling new requests, and the number of respective application instances handling active requests and therefore not available for handling new requests. Cached application instances are discussed in more detail below with reference to FIG. 4B. The one or more predefined criteria may also include one or more error criteria, which may be based on the number of errors encountered during execution of the application, and the type of errors encountered. For example, the application server may remove the respective application from volatile storage if severe errors are encountered during N (e.g., N equal to 5, 10 or 20, etc.) consecutive executions of the application.

For applications that fail to meet the predefined criteria (414-No), the application server removes the respective applications from volatile storage upon returning the result to the request (418). In some embodiments, the application server may remove the respective applications from volatile storage according to a predefined removal order. For example, the application server may remove the least recently used application.

In some embodiments, when determining which application instance to remove from volatile storage, the application servers take into account the service quality levels of the applications for which instances are stored in volatile memory. The service quality level of each application may be based on the level of service requested, or paid for. Various forms of preferences (for retention of application instances in volatile memory) may be given to applications with high service quality levels, compared to applications with lower service quality levels. For example, lower service quality level application instances may be evicted before higher service quality level application instances whenever a predefined condition is true. The predefined condition may relate to numbers or ratios of lower and higher service quality level application instances loaded in volatile memory. Alternately, scores may be computed to determine which application instances to unload from volatile memory, and computation of the scores may take into account the service quality levels of the applications.

For applications that meet the predefined criteria (414-Yes), the application server retains the respective applications in volatile storage for responding to future requests for the application (420). In some embodiments, the application server retains more than one application instance of the respective application in volatile storage in accordance with predefined caching criteria. In some embodiments, the application server limits the number of application instances in volatile storage. For example, the application server may limit the total number of application instances in volatile memory to ensure that there is sufficient volatile memory for other processing tasks. Alternatively, the application server may limit the number of instances of a respective application to ensure that other requested applications have access to sufficient volatile memory to service their requests.

In some embodiments, the method of some implementations comprises receiving, at the first application server 160-1 and from a front end server 140, a request for execution by an instance of the first application type. The front end server distributes requests for execution by an instance of the first application type in a round robin order, or a weighted random order with respect to the plurality of application servers specified by the corresponding data structure that specifies which of the plurality of application servers accept service requests for the first application type. Then, at the first application server, a respective instance of the first application type is executed in response to the request. Then the result to the request is returned.

Figure 4B:
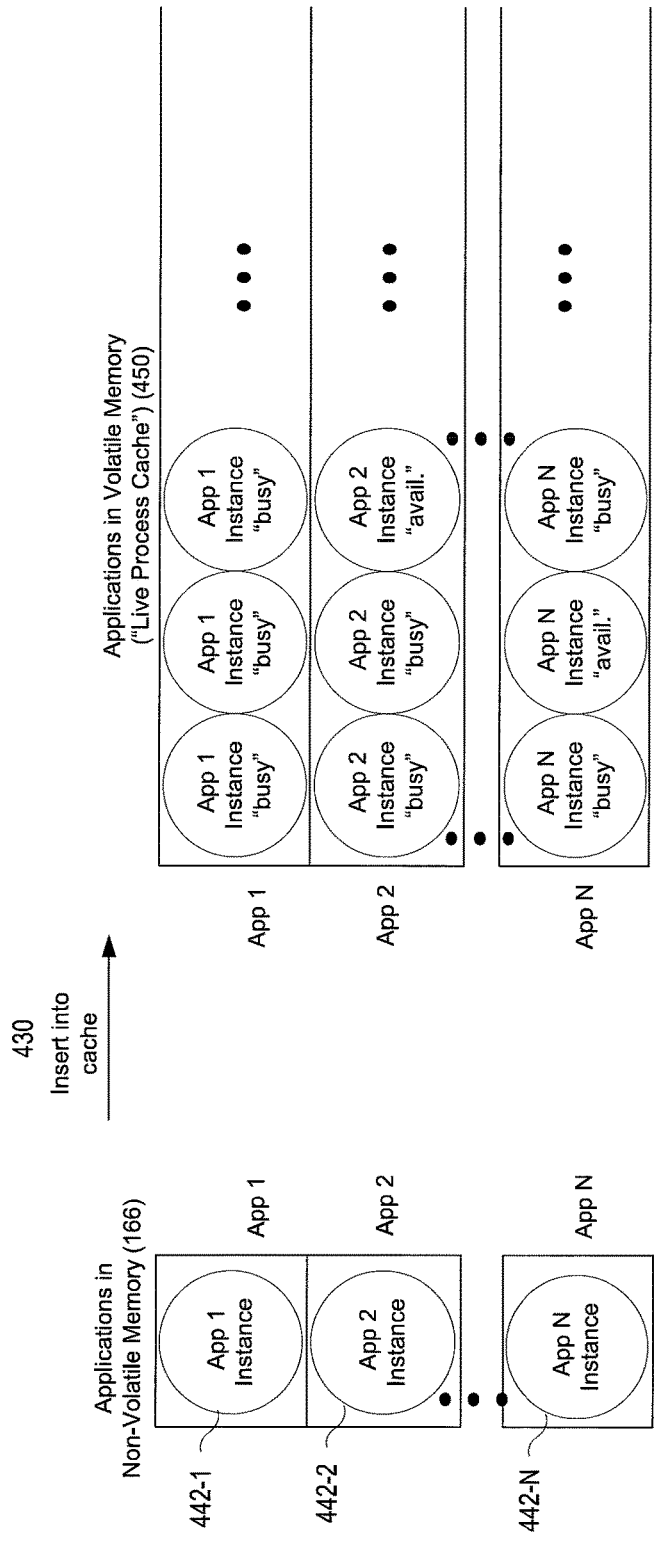
FIG. 4B is a conceptual diagram of the application request processing states for application instances in volatile memory of an application server, according to certain embodiments.

FIG. 4B is a conceptual diagram of the application request processing states for application instances in volatile memory of an application server, according to certain embodiments. In some embodiments, the application servers actively manage application instances in volatile memory through a live process cache 450. An application server first derives one or more applications (e.g., App 1 Instance 442-1, App 2 Instance 442-2, . . . , App N Instance 442-N) and stores the application(s) in non-volatile memory 166. The application server receives a request for "App 1." In some embodiments, in response to the request, an App 1 instance is loaded 430 into a cache (e.g., "Live Process Cache") 450. The cache may contain other instances of App 1 as well as instances of other requested applications. These application instances in the Live Process Cache 450 are either "busy" or "available," (although additional transitional states may be used in other embodiments). A "busy" application instance is one that is processing a current request (e.g., it is in an application request processing state and does not have enough CPU privileges or memory privileges to process an additional request or has reached a concurrent request limit), and therefore cannot process another incoming request until it finishes processing one or more of its current requests. The "available" instances are ready to process any received request for the respective application. In some embodiments, when all instances of the requested applications in the cache are "busy" a new version of the requested application is loaded into the cache 430, but when a requested application in the cache is "available," the "available" application will be used to respond to the request, rather than loading a new application instance from non-volatile memory.

Figure 4C:
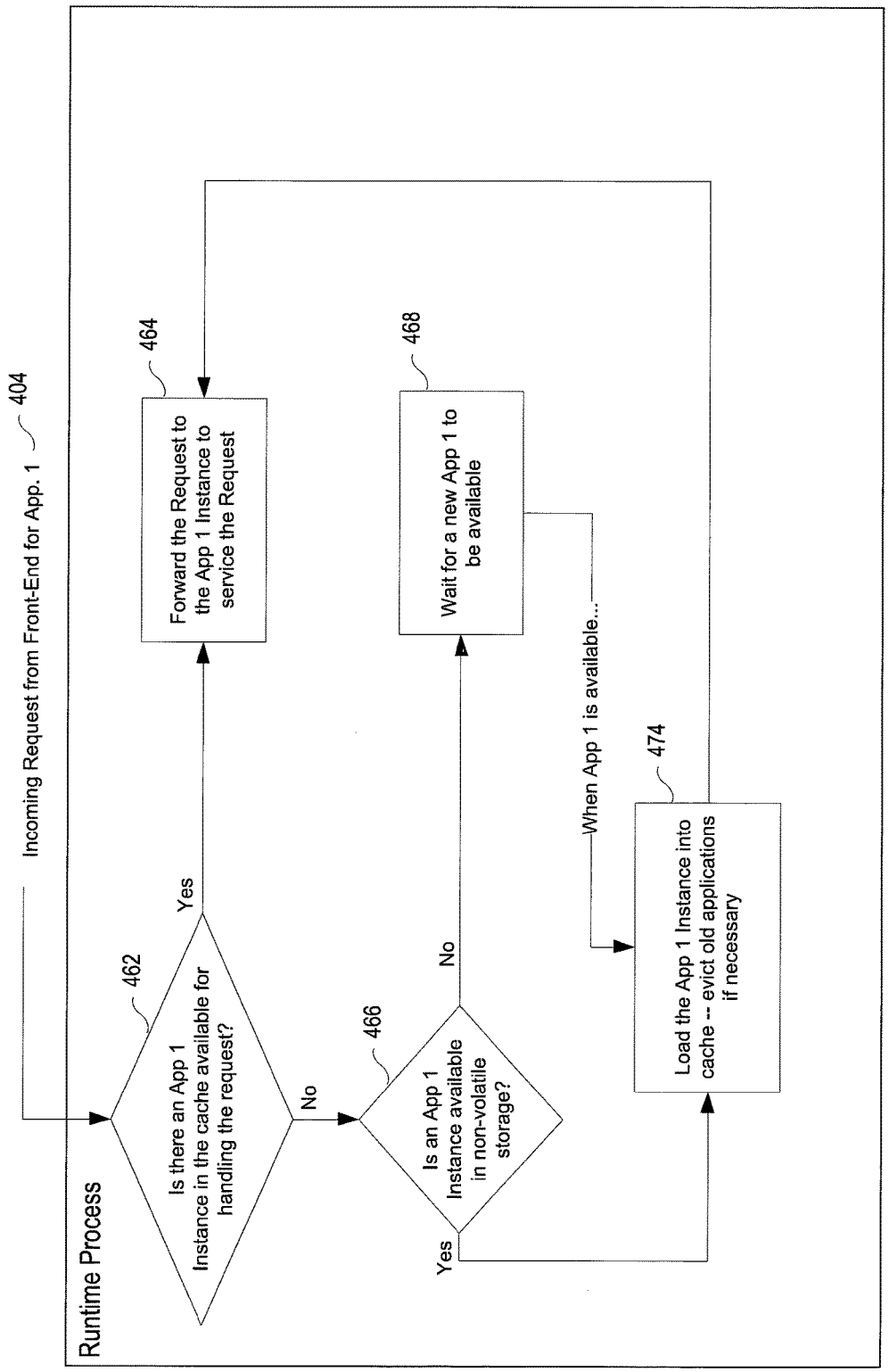
FIG. 4C is a flow diagram illustrating an example of a runtime process performed by an application server, according to certain embodiments.

FIG. 4C is a flow diagram illustrating an example of a runtime process performed by an application server 160, according to certain embodiments. For the purposes of this example, it is assumed that the application server has sufficient resources available to handle an incoming request to execute an application. Upon receiving a request 404 from the front-end for "App 1," the application server queries the cache (450, FIG. 4B) for an available "App 1" instance for handling the request. If the cache returns an available "App 1" instance (462-Yes), the request is forwarded to the returned instance for processing (464). If the cache does not return an available "App 1" instance (462-No), the application server determines if there is an "App 1" available in non-volatile storage (466), and if there is an "App 1" available (466-yes) the App 1 instance is loaded into the live process cache (474). Other application instances (e.g., the least recently used instance) are removed from the cache if necessary (e.g., to make room for new application instances). If there are no "App 1" instances available (466-No), the process waits for an instance to be available (468) in either volatile or non-volatile storage before performing operations 464 (and 474 as needed).

Figure 5:
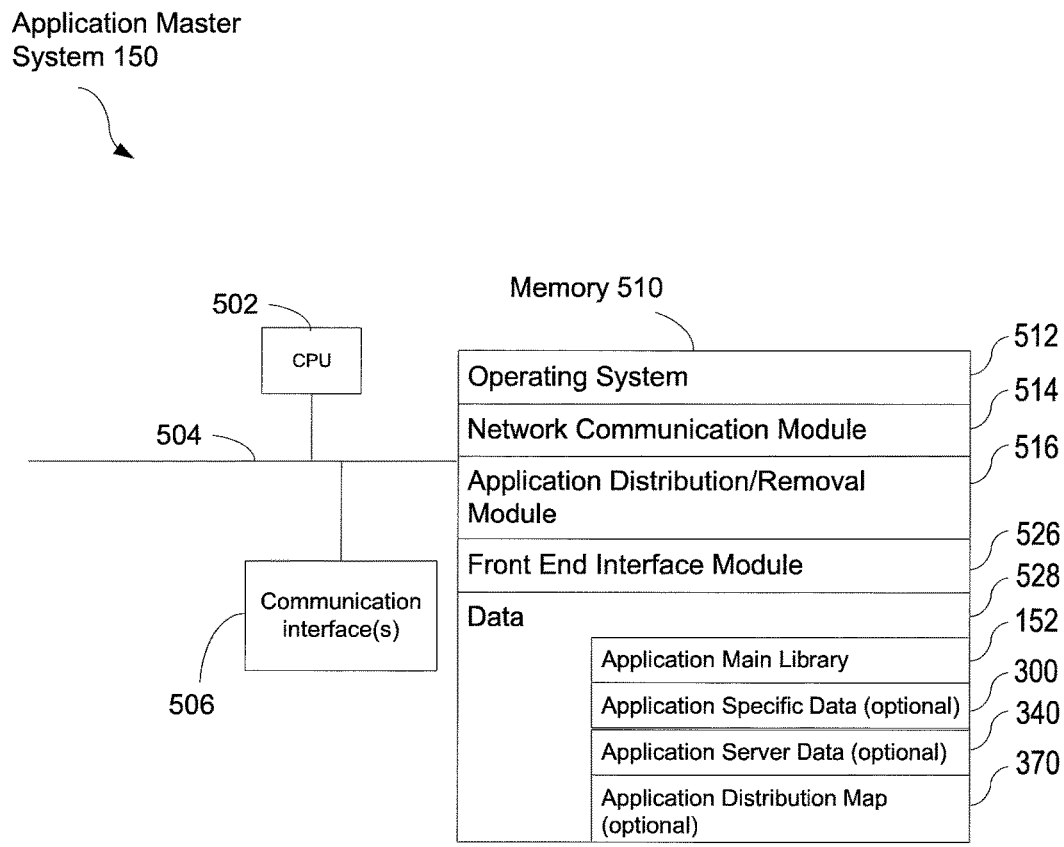
FIG. 5 is a block diagram of an application master in accordance with some embodiments.

FIG. 5 is a block diagram of an (optional) application master 150, which may implemented using one or more servers. For convenience, the application master 150 is herein described as implemented using a single server or other computer. The application master 150 generally includes one or more processing units (CPU's) 502, one or more network or other communications interfaces 506, memory 510, and one or more communication buses 504 for interconnecting these components. The communication buses 504 may include circuitry (sometimes called a chipset) that interconnects and controls communications between system components. Memory 510 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may include mass storage (e.g., data structure(s) 180 of FIG. 1) that is remotely located from the central processing unit(s) 502. Memory 510, or alternately the non-volatile memory device(s) within memory 510, includes a non-transitory computer readable storage medium. In some embodiments, memory 510 or the computer readable storage medium of memory 510 stores the following programs, modules and data structures, or a subset thereof:

an operating system 512 that includes procedures for handling various basic system services and for performing hardware dependent tasks;

a network communication module 514 that is used for connecting the application master 150 to other computers via the one or more communication network interfaces 506 (wired or wireless) and one or more communication networks, such as the Internet, other wide area networks, local area networks, metropolitan area networks, and the like;

an application distribution/removal module 516 that is used in some embodiments for distributing respective applications from the main library 152 (FIG. 1) to the application servers 160 for storage in non-volatile storage of the application servers either before; the application distribution/removal module 516 also optionally includes instructions for removing previously distributed applications from the non-volatile storage of respective application servers in accordance with the methods disclosed herein;

a front end interface module 526 that is used for interfacing with the front end servers 140 (FIG. 1); and data 528, which includes the main library data 152, and optionally includes application specific data 300, application server data 340, and/or the application distribution map 370.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Figure 6:
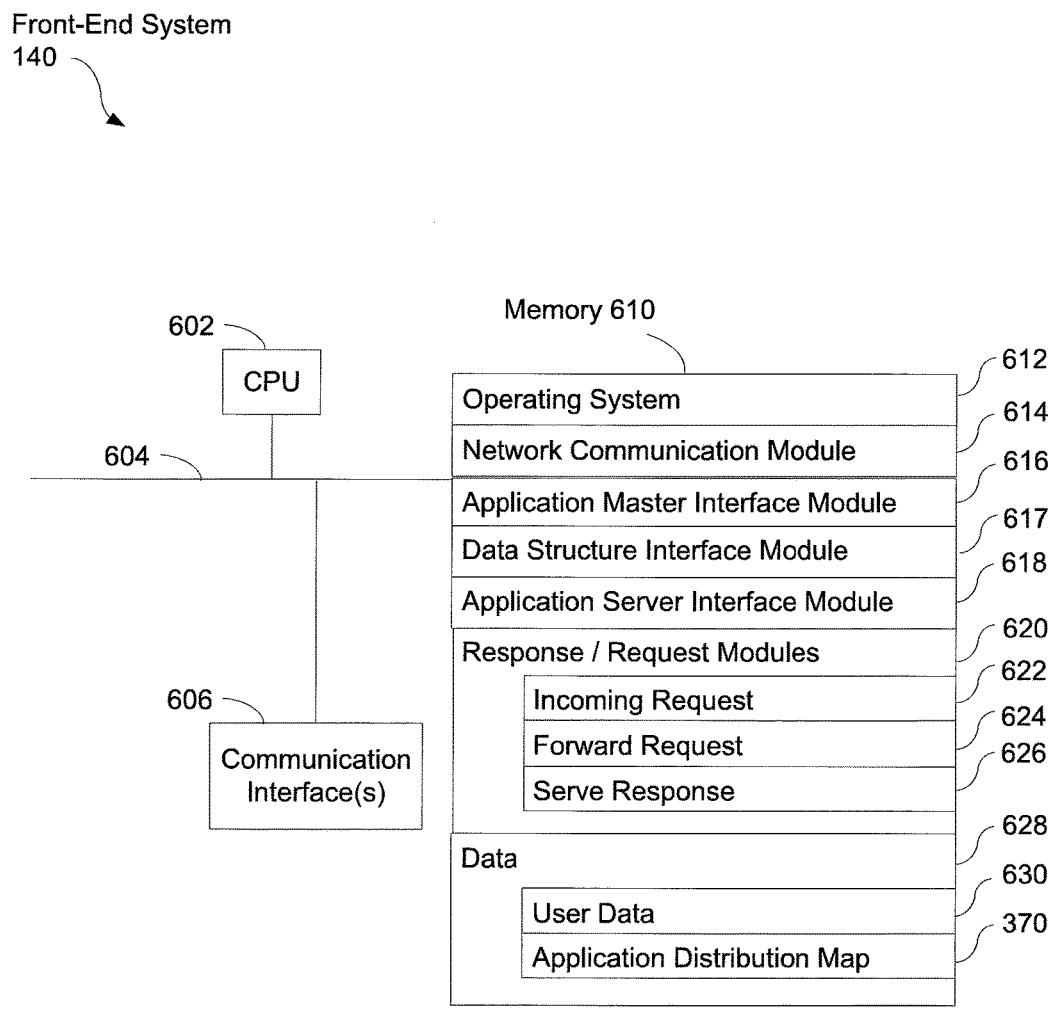
FIG. 6 is a block diagram of a front-end system in accordance with some embodiments.

FIG. 6 is a block diagram of a front-end system 140, which may implemented using one or more servers. For convenience, the front-end system 140 is herein described as implemented using a single server or other computer. The front-end system 140 generally includes one or more processing units (CPU's) 602, one or more network or other communications interfaces 606, memory 610, and one or more communication buses 604 for interconnecting these components. The communication buses 604 may include circuitry (sometimes called a chipset) that interconnects and controls communications between system components. Memory 610 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 610 may include mass storage (e.g., data store 170, data store 180 of FIG. 1) that is remotely located from the central processing unit(s) 602. Memory 610, or alternately the non-volatile memory device(s) within memory 610, includes a non-transitory computer readable storage medium. In some embodiments, memory 610 or the computer readable storage medium of memory stores the following programs, modules and data structures, or a subset thereof:

an operating system 612 that includes procedures for handling various basic system services and for performing hardware dependent tasks;

a network communication module 614 that is used for connecting the front-end server 140 to other computers via the one or more communication network interfaces 606 (wired or wireless) and one or more communication networks, such as the Internet, other wide area networks, local area networks, metropolitan area networks, and the like;

an (optional) application master interface module 616 that is used for interfacing with the (optional) application master 150 (FIG. 1);

a data structure interface module 617 used for interfacing with data structure(s) 180;

an application server interface module 618 that is used for interfacing with the application servers 160-1 to 160-n (FIG. 1);

response and request modules 620 for handling incoming client 102 requests for applications. In some embodiments, the response and request modules 620 include procedures for receiving incoming requests (e.g., Incoming HTTP Request) 622 and for forwarding the HTTP request to application servers 160 (FIG. 1) that host the requested application and accept service requests for the requested application (Forward HTTP Request) 624. The response and request modules 620 may also include procedures for serving responses from the application servers 160 to the clients 102 (Serve HTTP Response) 626.

data 628 which includes user data 630 and the application distribution map 370. In some embodiments, the user data 630 include client-specific information passed to the front-end 140 by the client 102 (e.g., parameters embedded in the HTTP request). The application distribution map 370 includes information used by the front-end to route application processing requests to application servers as described with respect to FIG. 3C.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Figure 7:
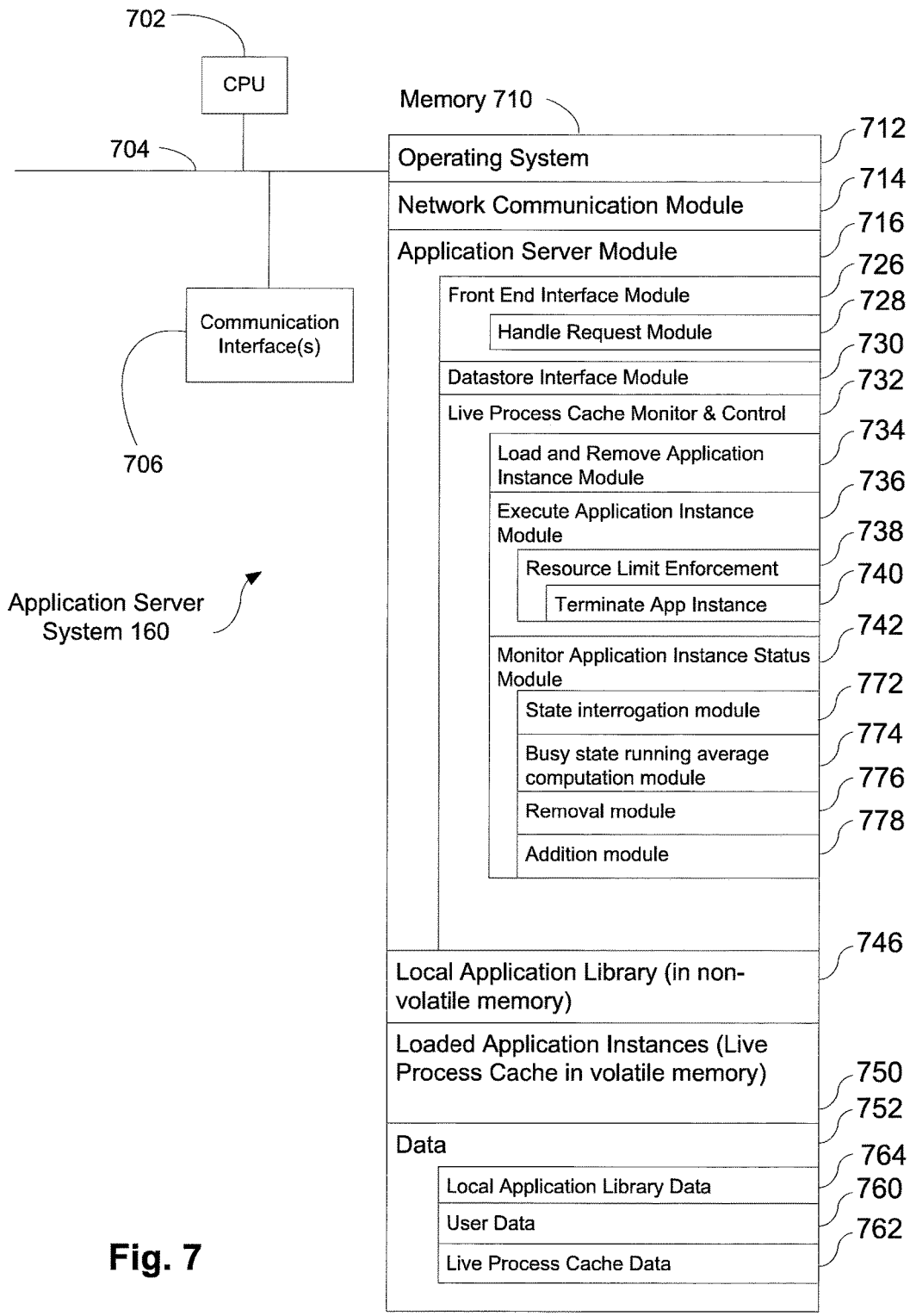
FIG. 7 is a block diagram of an application server in accordance with some embodiments.

FIG. 7 is a block diagram of an application server 160 in accordance with some embodiments, which may implemented using one or more servers. For convenience, the application server 160 is herein described as implemented using a single server or other computer. The application server 160 generally includes one or more processing units (CPU's) 702, one or more network or other communications interfaces 706, memory 710, and one or more communication buses 704 for interconnecting these components. The communication buses 704 may include circuitry (sometimes called a chipset) that interconnects and controls communications between system components. Memory 710 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 710 may include mass storage (e.g., data store 170, data store 180, of FIG. 1) that is remotely located from the central processing unit(s) 702. Memory 710, or alternately the non-volatile memory device(s) within memory 710, includes a non-transitory computer readable storage medium. In some embodiments, memory 710 or the computer readable storage medium of memory stores the following programs, modules and data structures, or a subset thereof:

- an operating system 712 that includes procedures for handling various basic system services and for performing hardware dependent tasks;
- a network communication module 714 that is used for connecting the application server 160 to other computers via the one or more communication network interfaces 706 (wired or wireless) and one or more communication networks, such as the Internet, other wide area networks, local area networks, metropolitan area networks, and the like;
- an application server module 716 that is used for processing application requests. In some embodiments, the application server module 716 includes a front-end interface module 726 for interfacing with the front-end 140, a data store interface module 730 for interfacing with the data structure(s) 180, and a live process cache monitor and control 732 for managing application instances in the live process cache 450 (FIG. 4B).
- a local application library 746, for storing the applications instances in non-volatile memory;
- application instances stored in volatile memory 750 (e.g., in a live process cache 450, FIG. 4B) for servicing application requests.
- data 752, including local application library data 764, which includes identification information about the local applications available. When needed, data 752 includes user data 760, which may include data received from a requesting user (e.g., user name, passwords, user preferences, profiling information) and/or data produced or retrieved for the requesting user by the application server. In addition, data 752 may include live process cache data 762, described below with reference to FIG. 8.

In some embodiments, the front end interface module 726 includes procedures for handling application requests (Handle Request Module) 728 forwarded from the front end server 140. In some embodiments, the application server module 716 also includes procedures (Live Process Cache Monitor & Control) 732 for monitoring and controlling the live process cache. These procedures include procedures (Load and Remove Application Instance Module) 734 for loading and removing application instances into the live process cache in accordance with application usage and available volatile memory. There are also procedures (Execute Application Instance Module) 736 for executing application instances when processing application requests.

The Execute Application Instance Module 736 may also include procedures (Resource Limit Enforcement) 738 for limiting resource consumption of a particular application. For example, an application that consumes more resources than a limit or threshold may be terminated (Terminate App Instance) 740. The resource limit may be a predefined amount or the threshold may vary depending on factors such as the number of requests for the application. For example, applications that receive higher numbers of requests may have a higher threshold before the application instance is terminated. Alternatively, the threshold may also depend on the amount of processing resources (e.g., one or more of: CPU time, "wall clock" time (i.e., total elapsed real time), memory, communication bandwidth, and number of system function calls made) consumed by the application. The threshold(s) may be applied per execution of an application, or to a running average of resources used over multiple executions of the application. An application instance that consumes resources above a corresponding threshold may be terminated.

The live process cache monitor & control module 732 may also include procedures for monitoring the status of application instances (Monitor Application Instance Status Module) 742. For example, the status of the application instances may be "busy," "available," or any transitional state in between (see FIG. 4B). In some embodiments, the Monitor Application Instance Status Module 742 includes a state interrogation module 772 for determining a number instances of a particular application type that are in a busy state at each time interval; a busy state running average computation module 774 for computing a running averages for the busy state of the application types (which is based upon the number of instances of a particular application type that are in a busy state, at the application server, at each respective time interval); a removal module 776 for sending removal requests to remove the application server from the corresponding data structure that specifies which of the plurality of application servers accept service requests for the a particular application type when the first running average for the busy state meets a removal criterion; and an addition module 778 for sending an addition request to add an application server to the corresponding data structure that specifies which of the plurality of application servers accept service requests for the particular application type when the first running average for the busy state meets an addition criterion.

Figure 8:
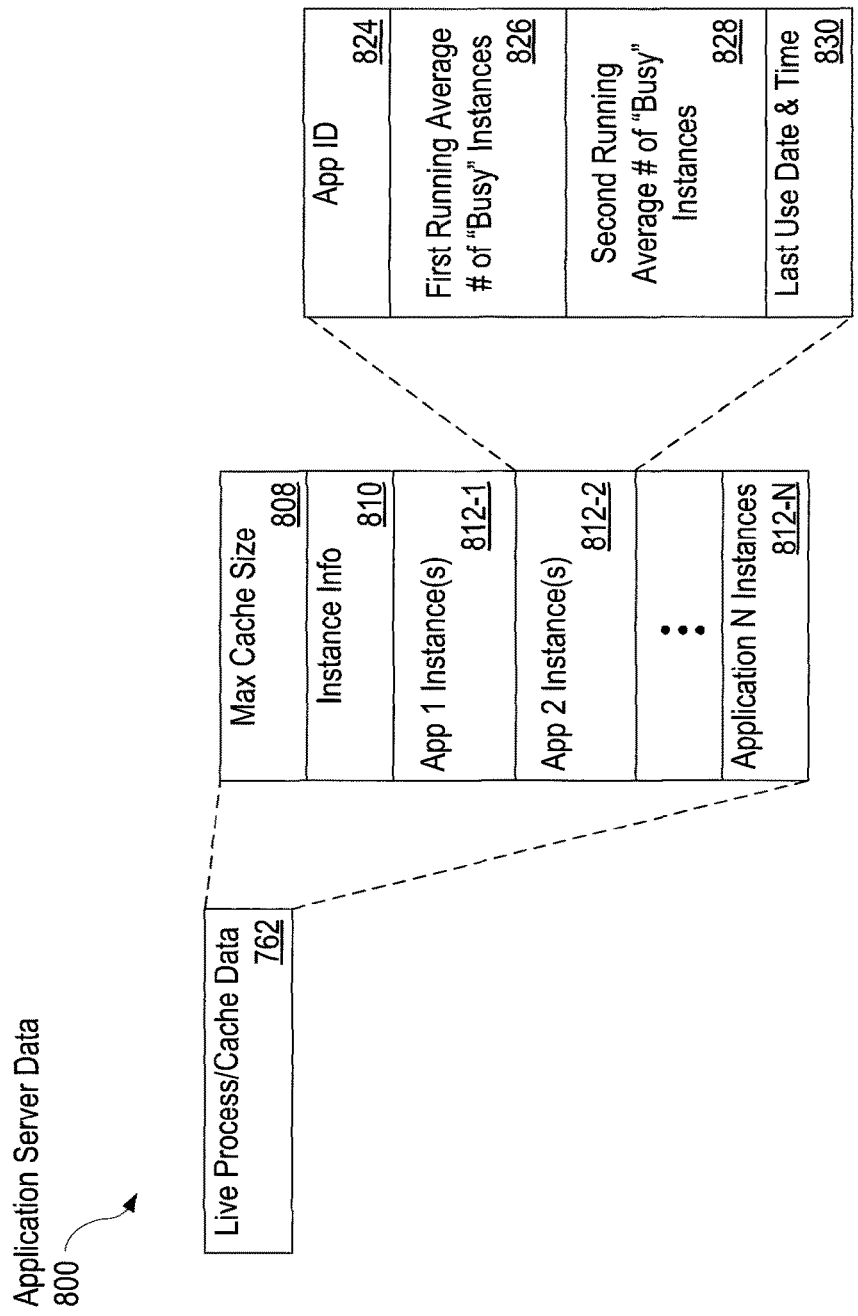
FIG. 8 is a block diagram illustrating a data structure for use by an application server for storing information relating to application instances in volatile memory in accordance with some embodiments.

FIG. 8 is a block diagram illustrating a data structure (live process cache data 762) for use by an application server 160-1 for storing information relating to application instances in volatile memory (e.g., Live Process Cache 450, FIG. 4B), for processing application requests in accordance with some embodiments. As shown in FIG. 8, live process cache data 762 includes the following items of information, or a subset or superset thereof:

- cache size information 808, which may be represented (for example) in terms of memory capacity (e.g., a number of gigabytes), or a maximum number of application instances that can be stored in the live process cache;
- the information regarding the application instances 810 that are currently available in non-volatile memory (442-1-442-N) for accepting service requests for the application; and
- information 812 about each of the application instances, currently in the live process cache 450. For example, information 812 may indicate for each application having at least one instance in the live process cache, the identity 824 of the application, a first running average of number of "busy" instances 826, a second running average of number of "busy" instances 828, and last use information 830 (e.g., the date/time of last use of the application, or other information sufficient to enable implementation of a cache eviction policy).

Each of the above identified elements in FIGS. 7 and 8 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 710 may store a subset of the modules and data structures identified above. Furthermore, memory 710 may store additional modules and data structures not described above.

Although FIGS. 5, 6, and 7 show an application master, a front end server, and an application server, respectively these figures are intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIG. 5, 6, or 7 could be implemented on single servers and single items could be implemented by one or more servers. The actual number of servers used to implement each such subsystem and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method of managing applications on an application execution system, the method comprising:
receiving, by one or more processors, a first instruction to execute a first application from a front-end server;
retrieving and loading, by the one or more processors, a first instance of a first application into volatile storage in response to receiving the first instruction;
executing, by the one or more processors, the first instance of the first application;
transmitting, by the one or more processors, a result indicator to the front-end server, the result indicator signaling that the executing has been completed;
after transmitting the result indicator, determining, by the one or more processors, whether the first application meets one or more criteria;
retaining, by the one or more processors, the first instance of the first application in volatile storage when the first application meets the one or more criteria, wherein the one or more criteria comprise at least one of: exceeding a number of respective application instances of the first application in volatile storage available for handling new requests; or exceeding a number of errors encountered during execution of the first application;
determining a state of the first instance of the first application, wherein the state of the first instance may be available or busy; and
receiving and loading, by the one or more processors, a first instance of a new version of the first application into volatile storage when a state of all instances of the first application is busy.

2. The method of claim 1, further comprising:
receiving a second instruction to execute the first application from the front-end server;
executing the first instance of the first application upon determining the state of the first instance of the first application is available.

3. The method of claim 1, further comprising:
receiving a second instruction to execute the first application from the front-end server;
retrieving and loading a second instance of a first application into volatile storage in response to receiving the second instruction and upon determining the state of the first instance of the first application is busy; and
executing the second instance of the first application.

4. The method of claim 3, further comprising:
transmitting another result indicator to the front-end server, the result indicator signaling that the executing of the second instance of the first application has been completed;
after transmitting the another result indicator, determining whether the first application meets one or more criteria; and
retaining the second instance of the first application in volatile storage when the first application meets the one or more criteria.

5. The method of claim 1, further comprising:
removing the first instance of the first application in volatile storage when the first application fails to meet the one or more criteria.

6. An application execution system for managing application comprising:
an application server having one or more processors coupled to memory, the one or more processors being configured to:
receive a first instruction to execute a first application from a front-end server;
retrieve and load a first instance of a first application into volatile storage in response to receiving the first instruction;
execute the first instance of the first application;
transmit a result indicator to the front-end server, the result indicator signaling that the executing has been completed;
after transmitting the result indicator, determine whether the first application meets one or more criteria;
retain the first instance of the first application in volatile storage when the first application meets the one or more criteria, wherein the one or more criteria comprise at least one of: exceeding a number of respective application instances of the first application in volatile storage available for handling new requests; or exceeding a number of errors encountered during execution of the first application;
determine a state of the first instance of the first application, wherein the state of the first instance may be available or busy; and
receive and load, by the one or more processors, a first instance of a new version of the first application into volatile storage when a state of all instances of the first application is busy.

7. The system of claim 6, wherein the processors are further configured to:
receive a second instruction to execute the first application from the front-end server;
execute the first instance of the first application upon determining the state of the first instance of the first application is available.

8. The system of claim 6, wherein the processors are further configured to:
receive a second instruction to execute the first application from the front-end server;
retrieve and load a second instance of a first application into volatile storage in response to receiving the second instruction and upon determining the state of the first instance of the first application is busy; and execute the second instance of the first application.

9. The system of claim 8, wherein the processors are further configured to:

transmit another result indicator to the front-end server, the result indicator signaling that the executing of the second instance of the first application has been completed;

after transmitting the another result indicator, determine whether the first application meets one or more criteria; and retain the second instance of the first application in volatile storage when the first application meets the one or more criteria.

10. The system of claim 6, wherein the processors are further configured to:

remove the first instance of the first application in volatile storage when the first application fails to meet the one or more criteria.

11. A non-transitory computer-readable medium storing instructions, which when executed by one or more processors, cause the one or more processors to:

receive a first instruction to execute a first application from a front-end server;

retrieve and load a first instance of a first application into volatile storage in response to receiving the first instruction;

execute the first instance of the first application;

transmit a result indicator to the front-end server, the result indicator signaling that the executing has been completed;

after transmitting the result indicator, determine whether the first application meets one or more criteria;

retain the first instance of the first application in volatile storage when the first application meets the one or more criteria, wherein the one or more criteria comprise at least one of: exceeding a number of respective application instances of the first application in volatile storage available for handling new requests; or exceeding a number of errors encountered during execution of the first application;

determine a state of the first instance of the first application, wherein the state of the first instance may be available or busy; and receive and load, by the one or more processors, a first instance of a new version of the first application into volatile storage when a state of all instances of the first application is busy.

12. The non-transitory computer-readable medium of claim 11, wherein the instructions further cause the one or more processors to:

receive a second instruction to execute the first application from the front-end server;

execute the first instance of the first application upon determining the state of the first instance of the first application is available.

13. The non-transitory computer-readable medium of claim 11, wherein the instructions further cause the one or more processors to:

receive a second instruction to execute the first application from the front-end server;

retrieve and load a second instance of a first application into volatile storage in response to receiving the second instruction and upon determining the state of the first instance of the first application is busy; and execute the second instance of the first application.

14. The non-transitory computer-readable medium of claim 13, wherein the instructions further cause the one or more processors to:

transmit another result indicator to the front-end server, the result indicator signaling that the executing of the second instance of the first application has been completed;

after transmitting the another result indicator, determine whether the first application meets one or more criteria; and retaining the second instance of the first application in volatile storage when the first application meets the one or more criteria.

15. The non-transitory computer-readable medium of claim 11, wherein the instructions further cause the one or more processors to:

remove the first instance of the first application in volatile storage when the first application fails to meet the one or more criteria.

* * * * *